Figure 1:
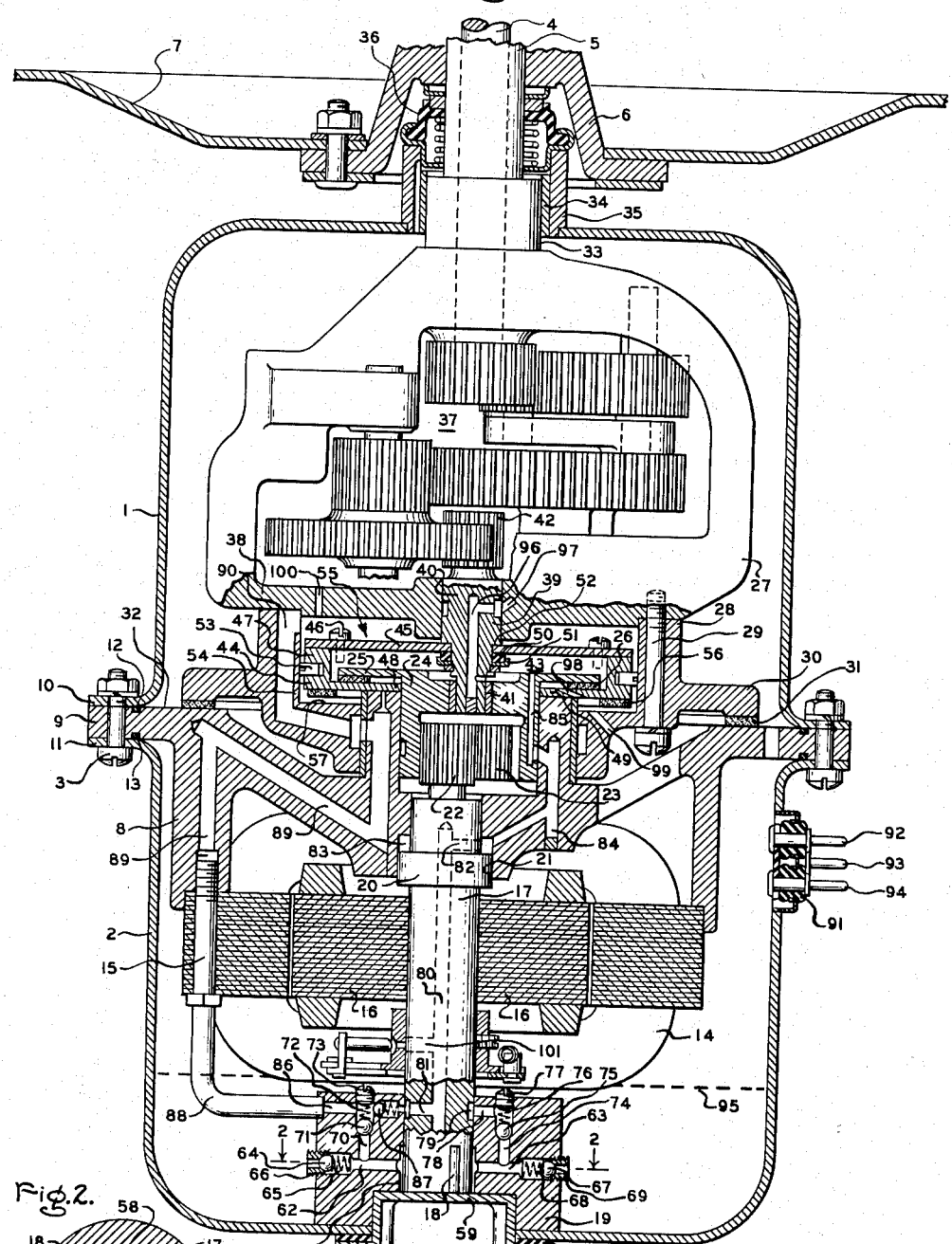

April 17, 1956

T. T. WOODSON 2,742,128

HYDRAULIC CLUTCH ACTUATION MEANS FOR
WASHING MACHINES AND THE LIKE

Filed Sept. 21, 1953

Inventor:
Thomas T. Woodson,
by
His Attorney.

United States Patent Office 2,742,128
Patented Apr. 17, 1956

2,742,128

HYDRAULIC CLUTCH ACTUATION MEANS FOR WASHING MACHINES AND THE LIKE

Thomas T. Woodson, Jeffersontown, Ky., assignor to General Electric Company, a corporation of New York Application September 21, 1953, Serial No. 381,384

5 Claims. (Cl. 192—87)

This invention relates to drive mechanisms, such as used in automatic washing machines, and more particularly to hydraulically actuated clutches for such mechanisms and the control of hydraulic pressure for actuating such clutches.

Automatic clothes washing machines, of the type to which this invention is particularly directed, include a suitable agitation means for imparting motion to a washing fluid for clothes contained within a basket, which basket subsequently may be rotated at high speed to extract centrifugally the washing fluid from the clothes. Such a machine requires a suitable drive mechanism which is effective to impart motion to the agitating means, for example oscillatory motion, and which also and selectively can rotate the clothes basket at high speed. For economy it is quite desirable that a single power source, such as an electric motor, be used both for agitation and for liquid extraction. Furthermore, the means for shifting from agitation to extraction should be as simple as possible and should be well adapted for inclusion in an entirely sealed mechanism.

An object of my invention is to provide a drive mechanism for a pair of driven shafts operable by selection of direction of rotation of the driving means to rotate selectively the driven shafts. In particular, it is an object of my invention to provide a drive mechanism for agitator and spin shafts of an automatic washer, driven selectively from a single power source, such as a motor dependent upon direction of rotation of such power source.

It is also an object of my invention to provide a hydraulic rotary pump for automatic operation control, so that fluid under pressure is delivered selectively to either of two discharge passages, dependent upon direction of pump rotation.

It is a further object of my invention to provide hydraulic actuation means for two or more clutches characterized by simplicity, economy for manufacturing purposes, and a minimum number of moving parts.

In accomplishment of the foregoing objectives, my invention is directed to a drive mechanism for driving selectively a pair of driven shafts from a common motor or other power source. This drive mechanism includes a pair of friction clutches with a hydraulic pressure chamber for each clutch. To provide a hydraulic pressure, I employ a directional rotary pump driven by the same motor. A particular feature of my invention is directed to the arrangement of the pump with suction and discharge passages and automatic check valves in said passages so that upon one direction of motor rotation, one of the discharge passages is effectively under pressure, while on reverse motor rotation, the other discharge passage is supplied with fluid under pressure. These two discharge passages thereby provide the hydraulic pressures required for selective clutch actuation, dependent upon direction of motor rotation.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a cross sectional elevation through an automatic washer drive mechanism embodying my invention; and Fig. 2 is a cross sectional view taken on the line 2—2 of Fig. 1.

This invention is disclosed by way of example, as embodied in an automatic washing machine drive mechanism of the general type disclosed and claimed in the application of Carl S. Dayton, Serial No. 226,801, filed May 17, 1951, entitled "Drive Mechanism for Clothes Washing Machines and the Like," now Patent No. 2,645,110 assigned to the General Electric Company, assignee of this application. However, as this description proceeds, it will become apparent that the teaching herein is equally applicable to other types of drive mechanisms, such as that shown in my copending application Serial No. 196,487, filed November 18, 1950, entitled "Drive Mechanism for Washing Machines and the Like," now Patent No. 2,657,783, likewise assigned to the General Electric Company assignee of this application.

While this invention is particularly adapted for an automatic washing machine, I have shown only such parts of the washing machine structure as are necessary to an understanding of this invention. If further details of the washing machine structure are desired, specific reference is made to my aforementioned copending application Serial No. 196,487 or to the aforementioned Dayton application Serial No. 226,801.

Figure 2:
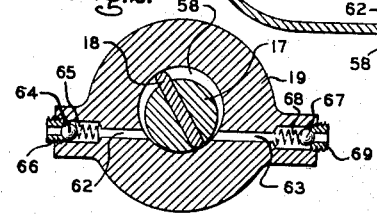

As shown in Fig. 1, the drive mechanism may be completely enclosed within a casing consisting of an upper half 1 and a lower half 2 held together by suitable fastening means such as 3. A driven shaft 4 is shown herein as being driven with an oscillatory motion which would be suitable for a washing machine agitator. Hence, I refer to shaft 4 as an agitator shaft. Encircling agitator shaft 4 is a second driven shaft or tube 5 upon which may be keyed a hub 6, which in turn carries a basket 7, such as the wash basket of an automatic washing machine. Therefore, I may hereinafter refer to the driven shaft 5 as a spin shaft or spin tube.

As shown in Fig. 1, I provide a relatively large frame 8 positioned substantially within the lower half 2 of the casing. The frame 8 includes a peripheral flange 9 of substantial thickness and of a diameter approximately equal to that of the flanges 10 and 11 of the casing, between which it is supported. A pair of circular gaskets 12 and 13 are pressed respectively between the flange 10 and the upper side of the flange 9 and the flange 11 and the lower side of the flange 9 to form an oil tight seal between the two halves of the casing. As will be further explained, the frame 8 forms both the supporting member for the drive motor and the brake surface for the spin basket retarding means.

The drive mechanism sealed within the casing comprises a motor 14 supported on the underside of the frame 8 by a plurality of bolts 15. The motor has a rotor 16 fixed to a shaft 17. At its lower end the shaft 17 drives an eccentric pump comprising a rotor vane 18 in a pump block or housing 19 (Fig. 2) which is effective to supply oil under pressure for the fluid pressure clutch actuating system as more fully described hereinafter. The shaft 17 is provided with an integral guide collar 20 rotatably positioned within a cylindrical bearing recess 21 in the motor supporting frame 8. On the upper end of the shaft is formed a pinion 22 which engages with an internal gear 23 cut within the lower end of a cylindrical member 24 journaled in the frame 8, and suitably restrained to prevent relative axial movement. Formed on the upper end of the cylindrical member 24, as a peripheral flange thereof, is the main clutch drive plate 25. This drive plate is provided with a clutch facing material 26 at its periphery and on its underside, which may be of any suitable friction material with proper wearing qualities. It is now apparent that upon energization of the motor 14, shaft 17 rotates at full motor speed, and drives the main clutch drive plate 25 through the medium of gears 22 and 23. By choosing gears of proper relative size the rotational speed of the clutch drive plate may be chosen according to rotational speed desired for driven shaft 5, for example for water extraction during the spin cycle of a washing machine. As shown in Fig. 1, the gear 23 is about twice the size of the pinion 22 and consequently a speed reduction of approximately one-half is provided. It will be noted that the main clutch drive plate 25 is driven at all times when the motor 15 is operating.

For selectively oscillating shaft 4 during washing, and rotating tube 5 and spin basket 7 during extraction, I provide a rotatable structure including an agitator gear casing 27 supported on a frame 28 and attached thereto by a plurality of screws 29. The frame 28 has a peripheral flange 30 on the underside of which is provided a brake facing 31 of any suitable friction material. The entire rotatable structure is supported by flange 30 which is normally seated on a flat upper surface 32 of peripheral flange 9 of main supporting frame 8. Thus the surface 32 constitutes a brake surface for the facing or shoe 31. Gear casing 27, along with frame 28 are unitary with spin tube 5.

To provide proper alignment of tube 5, I fix thereon a collar 33. The collar 33 is journaled in a bearing 34 mounted in a sleeve 35 extending upwardly from the upper half 1 of the casing. The sleeve 35 provides the opening in the casing through which spin tube 5 passes, which opening may be suitably sealed, as by a spring-backed rubber diaphragm 36.

A gear train 37 may be provided in a washing machine application for transmitting oscillatory motion to agitator shaft 4, and may be as shown and described in my patent 2,527,238, issued on October 24, 1950 for a Control for Automatic Washing Machine, and also owned by the General Electric Company. The gear train is completely enclosed within the casing 27, which casing includes a substantially imperforate bottom wall 38. I further provide a shaft 39 journalled near its upper end in a substantially concentric opening 40 in the bottom wall 38 of the gear casing and at its lower end in a bearing 41 positioned within the upper end of the cylindrical member 24. At its upper end the shaft 39 includes a pinion 42, which sets in motion the gear train 37. Oscillatably driven by the gear train 37 in a well known manner, such as described by my abovementioned patent, is agitator shaft 4 extending upwardly through spin tube 5. Consequently, when the shaft 39 is rotated, the agitator shaft 4 is oscillated to impart, for example, suitable washing action in a clothes washer.

In order to rotatably drive the agitator gear train actuating shaft 39 and the gear casing 27 in the selective manner hereinafter described, I provide a clutch arrangement comprising a hollow piston 43 non-rotatably carried below the gear casing 27 on the shaft 39. To simplify the assembly of the hollow piston 43, it may be constructed in two parts, including a lower cup-shaped portion 44 with its open end covered by a plate 45 attached by bolts 46 to an upstanding rim 47 formed integrally with the cup member. This cup member is provided with a central opening 48 accommodating the cylindrical member 24, which slidably and rotatably extends through it, so that the drive clutch plate 25 is contained within the piston cavity. The underside of the lower portion 44 of the piston is supported on the frame 8 at the substantially horizontal upper surface 49 formed thereon, which surface serves as a thrust bearing for the piston and prevents downward movement of the piston and the shaft 39.

While the cover plate 45 may be attached to the shaft 39 by any suitable means, I have shown a structure comprising a deformable washer 50 pressed between a metal washer 51 and the plate 45 by means such as a snap ring carried on the shaft. The plate 45 is positioned against a shoulder 52 formed above it on shaft 39. This particular means of attaching the piston to the shaft has the advantage of permitting a slight tilting of the piston relative to the shaft under clutch engaging pressure so that good contact between the faces, as explained hereinafter, will be maintained.

The rim 47 of the cup 44, forming the lower half of the piston 43, is recessed at its periphery to accommodate a suitable split ring rotating seal 53, which seals by contact with the inner cylindrical wall 54 of the gear casing supporting frame 28, within which the piston 43 is positioned.

A spin clutch pressure chamber 55 is defined by the bottom wall 38 of the gear casing, the upper piston plate 45, the split ring seal 53, and the wall 54 of frame 28. The split ring seal is sufficiently effective that oil pressure can be built up in chamber 55 when oil under pressure in sufficient quantity is supplied to this cavity as presently explained.

Near the periphery of the underside of the cup 44 I provide a clutch facing 56 made of suitable friction material. The clutch facing 56 engages a flat horizontal face 57, formed on the frame 28, when the frame 28 is elevated. Consequently, the rotatable piston 43 constitutes both the driven member of the main drive clutch and the drive member of the spin clutch. Since in the inoperative position of the drive mechanism, as seen in Fig. 1, the piston 43 is supported and held against downward movement by the bearing face 49 formed on the motor supporting frame 8, engagement of the clutch members 56 and 57 can take place only when the gear frame 28 is elevated.

The details of the construction thus far presented have been disclosed and claimed in the aforementioned Dayton application Serial No. 226,801, now Patent No. 2,645,110, and hence form no part of the invention of this application. My invention is particularly directed to the means for supplying fluid under pressure to the space within hollow piston 43 and to chamber 55 selectively dependent upon direction of rotation of the motor rotor 16.

A directional fluid pump is shown by Figs. 1 and 2 driven directly from the drive motor 14. As illustrated, this pump includes pump block 19, of generally cylindrical configuration, with an eccentrically located cylindrical pump chamber 58 therein. The lower end of motor shaft 17 extends downwardly into pump block 19, and is supported on a thrust bearing plate 59. Bearing plate 59 in turn is secured to lower casing section 2 by fastening devices 60 with appropriate gasket means 61 to provide a fluid tight joint between the bearing plate and the casing. The lower end of the motor shaft is slotted to receive vane 18, which in conjunction with the motor shaft forms a pump rotor rotating within pump chamber 58. While I have shown an eccentric vane type pump, it is to be understood that other types of pumps may be employed, so long as the pump is directional, i. e., a pump which delivers fluid in one direction upon rotation in a first direction with reversal of the direction of flow upon reversal of rotor rotation.

Pump block 19 is drilled to provide a pair of suction passages 62 and 63. Within passage 62 is a check or directional valve comprising a ball 64 biased by a spring 65 outwardly against an insert 66. Thus fluid can flow inwardly through the pump block into the pump chamber, but is prevented from flowing outwardly by this check valve. Similarly, suction pasage 63 is provided with a ball check valve including ball 67 biased by spring 68 outwardly against an insert 69. With this arrangement it can be seen that when pump rotor 18 rotates in a clockwise direction, fluid is drawn inwardly through the check valve through passage 62; while counterclockwise rotation of the pump rotor draws fluid inwardly through passage 63.

A pump discharge passage 70 interconnects with suction passage 62 between the pump chamber and check valve 64. Passage 70 is normally closed by a check valve consisting of ball 71 spring biased into position by spring 72 adjustably held in place by screw 73. Suction passage 63 likewise has an interconnecting discharge passage 74 in which is located a check valve including ball 75 held in position by spring 76, which in turn is backed by an adjustable screw 77.

It is to be noted that fluid flow through discharge passage 74, after passing the check valve, enters a lateral passage 78 in the pump block communicating with an annular groove 79 in the motor shaft. Thus continuous communication is provided between passage 78 in the pump block and a central passage 80 extending axially upwardly through shaft 17 from a radial interconnecting passage 81. The upper end of axial passage 80 joins a second radial passage 82 in the shaft which leads to an annular groove 83 in supporting frame 8. By means of the further interconnecting passages 84 and 85, fluid is conducted to the interior of piston 43.

Referring now to the discharge passage 70, downstream of the check valve is a lateral passage 86 in the pump block. Passage 86 is connected to a tube 88 affording a closed fluid flow path to passages 89 through the motor supporting frame to passage 90 in gear supporting frame 28 into the pressure chamber 55. Discharge passage 86 also has one-way communication with the axial passage in the motor shaft by means of spring biased check valve 87. Hence discharge through passage 70 results in substantially equal hydraulic pressures in both chambers 55 and 43; while discharge through passage 74 pressurizes only the interior of piston 43.

Motor 14 may be supplied with electrical power through a suitable sealed terminal structure 91 including terminals 92, 93 and 94 for motor start and run windings in a manner well known in the art. By means of any suitable control mechanism (not shown) the power supply to the motor is controlled so that it rotates in either a clockwise or counterclockwise direction selectively. With the motor rotor rotating in a clockwise direction as viewed in Fig. 2, it is seen that fluid contained in the lower part of casing section 2 is drawn into the pump chamber through suction passage 62. Conveniently, casing section 2 may contain a charge of liquid such as lubricating oil to the level 95 indicated by the dotted line. Hence the suction lines leading into the pump chamber are always below the liquid level. The check valve of course permits inward flow when the pump is operating. Thus upon clockwise rotor rotation, the fluid drawn in through suction passage 62 is expelled through passage 74, check valve 75, and through passage 78 into the radial and axial passages in motor shaft 17. Check valve 87, of course, prohibits flow into line 88. By means of the interconnecting passages 84 and 85, the liquid under pressure is admitted into the hollow piston 43 to force disk 25 and the friction material 26 thereon into engagement with piston 44. As previously described, disk 25 is driven whenever the motor is rotating and hence by engagement of disk 25 with the piston bottom wall 44, the piston rotates with the disk. Rotation of the piston, by means of top plate 45, rotates shaft 39 to impart motion to gear train 37 and thus oscillate shaft 4. Gear casing and frame 27-28 remain stationary since the clutch facing 31 of the frame is resting upon the stationary motor frame 8. From this it may be seen that whenever motor rotor 16 rotates in a clockwise direction, as viewed in Fig. 2, the spin tube 5 is held stationary by engagement of brake members 31 and 32, while the agitator shaft 4 is oscillated by means of gear train 37 driven by shaft 39. Shaft 39 is connected to the motor through a friction clutch actuated by fluid pressure delivered from the pump. Pressure relief from hollow piston 43 may be provided by means of radial and axial passages 96 formed within shaft 39, which passages lead to a passage 97 opening into the space within gear casing 27. It is to be understood of course that these pressure relief passages drain liquid from piston 43 at a slower rate than the liquid supply rate from the pump to the piston chamber. By employing a lubricant in the reservoir, the pressure relief arrangement serves the additional function of lubricating gear train 37. Prior to motor rotation, it is clear that there is no hydraulic pressure within piston 43, and hence clutch facing 26 does not drivingly engage the interior surface of the piston. Motor 14 therefore starts without load. Furthermore, if at any time during operation of the motor an excessive load is imposed thereon, its decrease in rotational speed will result immediately in a decrease in pressure within piston 43 permitting slippage of clutch facing 26. Preferably fluid drainage is provided for the space within piston 43 beneath disk 25 so that trapped liquid cannot prevent engagement of the clutch. Such drainage may be provided for example by a passage 98 through the lower wall of the piston and through a passage 99 in gear frame 28 from which the liquid may flow back into the liquid reservoir.

Upon rotation of the motor in a counterclockwise direction, liquid from the reservoir is drawn into pump chamber 58 through suction passage 63. In view of the check valve arrangement in pump block 19, the liquid under pressure is then discharged through passage 70 and check valve 71 into passage 86. From discharge passage 86, hydraulic pressure is applied through tube 88, passages 89 and 90, into spin pressure chamber 55. Check valve 87 simultaneously permits pressure build-up, through axial passage 80, in the hollow piston chamber 43 in the manner previously described. Hence, disk 25 driven by the motor engages with the interior wall of the piston to drive the piston. The pressure buildup in chamber 55 raises gear casing 27 and the attached frame 28, as well as spin tube 5 and the structure carried thereby. It is apparent that the initial upward movement of the gear casing and frame disengages friction facing 31 from the motor frame 8, thereby freeing the entire gear casing and frame for rotation as a unit. However, further upward movement of the gear casing and frame engages clutch facing 56 on the lower surface of the piston with the corresponding or mating surface 57 of the gear supporting frame 28. Engagement of this clutch within chamber 55 results in the entire gear frame and casing being driven directly by motor 14, thereby rotating spin tube 5 and its related structure. Again suitable pressure relief means for chamber 55 may be provided, such as by the auxiliary passage 100 leading from chamber 55 into the gear casing 27. Since gear casing 27 is rotating as a unit, there is no relative motion between pinion 42 and its mating gear of gear train 37, and hence there is no oscillation of shaft 4; however shaft 4 is rotating at the same speed as spin tube 5.

Both chambers 55 and 43 are under pressure for spin, and substantially the same pressure prevails in each. However, because of the difference in area between members 25 and 45, clutch facing 26 will always slip first, while gear frame 27, plate 45, and shaft 39 remain in engagement. Hence there can be no relative motion between agitator and basket during spin.

From the above description, it is seen that upon clockwise rotation, or rotation in one direction of the motor, fluid under pressure is supplied only to the cavity within piston 43. Hence, only the one clutch is engaged to drive shaft 4 with an oscillatory motion. Upon reverse rotation of the motor, liquid under pressure is supplied both to the interior of piston 43 and to the pressure chamber 55.

This results in engagement of both clutch disk 25 with the piston and the piston with gear supporting frame 28. However, before this second clutch engages, the brake is released so that the gear frame is floating prior to its connection to the driving motor. Control of a device such as an automatic washing machine is facilitated by this invention since it is necessary merely to reverse the driving motor to provide a selection between agitation and centrifugal extraction.

It will be understood of course that additional protective devices may be incorporated along the lines disclosed by the aforementioned Dayton application, Serial No. 226,801, now Patent 2,645,110. For example, a centrifugally operated pressure relief valve should be provided in connection with axial passage 80. As shown, this can be accomplished by use of a radial passage 101 in the motor shaft, which is normally open, and which is progressively closed upon increase in shaft speed by the increase in centrifugal force, all as described in detail in the aforementioned Dayton application, Serial No. 226,801 of May 17, 1951, now Patent 2,645,110. Thus pressure in passage 80 is controlled to make the motor work at optimum load, excessive load resulting in speed and pressure reduction followed by slippage of clutch disk 25.

While the present invention has been described by reference to a particular embodiment thereof, it is to be understood that numerous modifications may be made by those skilled in the art without actually departing from the invention. I, therefore, aim in the appended claims to cover all such equivalent variations as come within the true spirit and scope of the invention.

What I claim as new and desire to secure by Letters Patent of the United States is:

1. In a drive mechanism, a reversible electric motor, a pair of hydraulic pressure actuated clutches, first and second driven members to which power is transmitted selectively through said clutches, hydraulic pressure means for actuating said clutches selectively dependent upon direction of motor rotation, a hydraulic fluid reservoir, a pump block including a pump chamber therein, a pump rotor in said chamber driven by said motor, a pair of one-way suction passages for conducting fluid from said reservoir into said pump chamber with one of said suction passages effective for each direction of rotation, check valve means to prevent reverse flow through said suction passages, a first discharge for receiving pump discharge on motor rotation in clockwise direction, a second discharge passage for receiving pump discharge upon motor rotation in a counterclockwise direction, and means interconnecting said discharge passages respectively with the hydraulic pressure means for said clutches.

2. In a drive mechanism, a reversible motor, a pair of hydraulic pressure actuated clutches, first and second driven members to which power is transmitted respectively through said clutches, hydraulic pressure means for actuating said clutches selectively dependent upon direction of motor rotation, a hydraulic fluid reservoir, a hydraulic pump of the type having an eccentric vaned rotor driven by said motor within a cylindrical pump chamber, a first suction passage communicating between said reservoir and said pump for supplying fluid thereto upon clockwise rotor rotation with check valve means preventing reverse flow, a second suction passage supplying fluid to said pump from said reservoir upon counterclockwise rotor rotation with check valve means to prevent reverse flow, pump discharge passages communicating respectively with said suction passages between said pump and said check valve means, a check valve in each of said discharge passages to permit only outward flow, and means affording communication from said discharge passages to respective of the hydraulic pressure means for said clutches.

3. In an automatic washer drive mechanism, an agitation drive shaft, an extraction drive shaft, a reversible electric motor, a pair of hydraulic pressure actuated clutches through which power is transmitted respectively to said agitation drive shaft and said extraction drive shaft, hydraulic pressure means for actuating each of said clutches, a liquid reservoir, a hydraulic pump of the type having a rotor within a pump chamber for pumping liquid in a direction dependent upon the direction of rotation, a first suction passage communicating from said reservoir to said pump chamber for liquid supply upon clockwise rotation with check valve means preventing reverse flow, a second suction passage for liquid supply from said reservoir to said pump chamber upon counterclockwise rotation with check valve means preventing reverse flow, pump discharge passages communicating respectively with said suction passages between said pump chamber and said check valve means, a check valve in each of said discharge passages to permit only discharge flow, and means affording communication from said discharge passages to respective of the hydraulic pressure means for actuating said clutches.

4. In an automatic washer drive mechanism, an agitation drive shaft, an extraction drive shaft, a reversible electric motor, a pair of hydraulic pressure actuated clutches through which power is transmitted respectively to said agitation drive shaft and said extraction drive shaft, hydraulic pressure means for actuating each of said clutches, a liquid reservoir, a hydraulic pump of the type having a rotor within a pump chamber for pumping liquid in a direction dependent upon the direction of rotation, means providing communication between said reservoir and the inlet to said pump for either direction of rotation, a first discharge passage from said pump communicating with said hydraulic pressure means for one of said clutches, a second discharge passage communicating with said hydraulic pressure means for the other of said clutches, an inter-communicating passage between said discharge passages, and check valve means in said passages responsive to the direction of discharge flow from said pump to supply hydraulic pressure for actuation of one of said clutches upon rotation of the pump in a first direction and to supply hydraulic pressure for actuation of both of said clutches upon rotation in the opposite direction.

5. In a drive mechanism, a reversible electric motor, a pair of hydraulic pressure actuated clutches, first and second driven members to whch power is transmitted respectively through said clutches, hydraulic pressure means for actuating said clutches selectively, a hydraulic fluid reservoir, a pump block including a pump chamber therein, a pump rotor in said chamber driven by said motor, suction passages for conducting fluid from said reservoir into said pump chamber upon either direction of pump rotation directional flow responsive means to prevent reverse flow through said suction passages, a first discharge passage for receiving pump discharge on motor rotation in a clockwise direction, a second discharge passage for receiving pump discharge upon motor rotation in a counterclockwise direction, and means interconnecting said discharge passages respectively with said hydraulic pressure means for actuating said clutches.

References Cited in the file of this patent

UNITED STATES PATENTS

| | | |
|---|---|---|
| 1,951,211 | Sass | Mar. 13, 1934 |
| 2,187,835 | Martin | Jan. 23, 1940 |